H. M. GILBERT.
BRUSH RAKE.
APPLICATION FILED JAN. 6, 1917.
1,225,432.
Patented May 8, 1917.
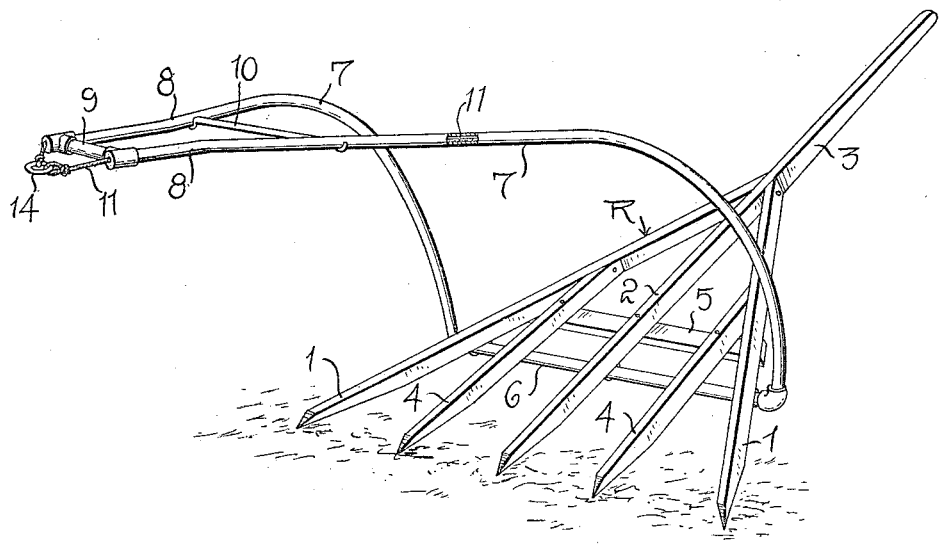
Inventor
HORACE M. GILBERT
By Watson E. Coleman
Attorney

UNITED STATES PATENT OFFICE.

HORACE M. GILBERT, OF NORTH YAKIMA, WASHINGTON.

BRUSH-RAKE.

1,225,432. Specification of Letters Patent. Patented May 8, 1917.

Application filed January 6, 1917. Serial No. 140,995.

*To all whom it may concern:*

Be it known that I, HORACE M. GILBERT, citizen of the United States, residing at North Yakima, in the county of Yakima and State of Washington, have invented certain new and useful Improvements in Brush-Rakes, of which the following is a specification, reference being had to the accompanying drawings.

This invention relates to certain improvements in brush rakes and it is an object of the invention to provide a device of this general character with novel and improved means whereby the requisite pull may be imparted thereto.

The invention consists in the details of construction and in the combination and arrangement of the several parts of my improved rake whereby certain important advantages are attained and the device is rendered simpler, less expensive and otherwise more convenient and advantageous for use, all as will be hereinafter more fully set forth.

The novel features of the invention will hereinafter be definitely claimed.

In order that my invention may be the better understood, I will now proceed to describe the same with reference to the accompanying drawings, wherein is disclosed a view in perspective with a portion broken away of a brush rake constructed in accordance with an embodiment of my invention.

As disclosed in the accompanying drawings, R denotes the rake including the diverging tines 1 and the intermediate tine 2 which is extended rearwardly, as at 3, to afford a handle member. The inner ends of the tines 1 are secured to the opposite faces of the tine 2, and 4 denotes tines disposed intermediate the tines 1 and 2 and secured to the tines 1 and to the cross brace 5 which also connects the tines 1 and 2.

Arranged below the tines 1, 2 and 4 and suitably secured thereto is a tubular member 6, preferably pipe, and which has secured to its opposite extremities the lower ends of the upwardly directed tubular members 7 which terminate in the forwardly and converging portions 8. The outer extremities of the portions 8 are tied or connected by the cross section 9 and are further connected at substantially midway the length of said portions 8 with the cross member 10.

Disposed through the tubular members 7 and the portions 8 thereof and the tubular member 6, is the flexible member or cable 11, the outer extremities of which being secured to the ring 14 or the like and which is adapted to serve as a hitch for the draft animals.

In a rake of this general character it is necessary that the pull must be made from a point high enough so as not to catch or become entangled in the brush.

From the foregoing description, it is thought to be obvious that a rake constructed in accordance with my invention is of an extremely simple and comparatively inexpensive nature and is particularly well adapted for use by reason of the convenience and facility with which it may be assembled, and it will also be obvious that my invention is susceptible of some change and modification without material departure from the principles and spirit thereof and for this reason I do not wish to be understood as limiting myself to the precise arrangement and formation of the several parts herein shown in carrying out my invention in practice, except as hereinafter claimed.

I claim:

A brush rake comprising an elongated tine, side tines diverging therefrom, supplemental tines arranged at opposite sides of the first named tine and secured at their inner ends to the diverging tines, a brace member secured to all of the tines, a tubular member underlying all of the tines and terminating in upstanding forwardly directed extensions, a flexible member disposed through said tubular member and the extensions and with the extremities of said flexible member terminating in advance of the free ends of the extension, and a hitch member to which said extremities of the flexible member are secured.

In testimony whereof I hereunto affix my signature in the presence of two witnesses.

HORACE M. GILBERT.

Witnesses:
H. G. RIDEOUT,
F. E. BARBOUR.

Copies of this patent may be obtained for five cents each, by addressing the "Commissioner of Patents, Washington, D. C."